(12) United States Patent
Kipping

(10) Patent No.: US 8,667,899 B2
(45) Date of Patent: Mar. 11, 2014

(54) COMBINED CYCLE POWERED RAILWAY LOCOMOTIVE

(76) Inventor: John Kipping, Toronto (CA)

( * ) Notice: Subject to any disclaimer, the term of this patent is extended or adjusted under 35 U.S.C. 154(b) by 0 days.

(21) Appl. No.: 13/586,555

(22) Filed: Aug. 15, 2012

(65) Prior Publication Data

US 2012/0304617 A1 Dec. 6, 2012

Related U.S. Application Data

(63) Continuation of application No. 12/473,804, filed on May 28, 2009, now abandoned.

(60) Provisional application No. 61/056,689, filed on May 28, 2008.

(51) Int. Cl.
*B61C 17/00* (2006.01)

(52) U.S. Cl.
USPC .......................... 105/26.05; 105/38

(58) Field of Classification Search
USPC ......... 105/26.05, 35, 36, 37, 38, 39, 48, 48.2, 105/48.3, 61.5, 62.1
See application file for complete search history.

(56) References Cited

U.S. PATENT DOCUMENTS

| | | | | |
|---|---|---|---|---|
| 1,953,078 | A * | 4/1934 | Holzwarth | 60/39.182 |
| 2,010,021 | A | 8/1935 | Holzwarth | |
| 2,012,963 | A | 9/1935 | Holzwarth | |
| 2,482,819 | A | 9/1949 | Williams | |
| 2,663,145 | A * | 12/1953 | Waeselynck | 60/39.182 |
| 2,970,434 | A | 2/1961 | Warren | |
| 3,148,503 | A * | 9/1964 | MacPhail et al. | 60/39.182 |
| 3,500,636 | A | 3/1970 | Craig | |
| 3,605,406 | A * | 9/1971 | Woolley | 60/39.182 |
| 3,618,719 | A | 11/1971 | Marland et al. | |
| 3,703,146 | A * | 11/1972 | Kovats | 105/61.5 |
| 3,990,230 | A | 11/1976 | Kuwashima et al. | |
| 4,214,450 | A | 7/1980 | Nagashima et al. | |
| 4,275,558 | A | 6/1981 | Hatch et al. | |
| 4,823,546 | A | 4/1989 | Cheng | |
| 4,899,537 | A | 2/1990 | Cheng | |
| 4,951,460 | A | 8/1990 | Prochaska et al. | |
| 5,471,832 | A * | 12/1995 | Sugita et al. | 60/39.182 |
| 5,649,416 | A | 7/1997 | Moore | |
| 5,778,675 | A | 7/1998 | Nakhamkin | |
| 6,306,056 | B1 * | 10/2001 | Moore | 475/5 |
| 6,397,759 | B1 * | 6/2002 | Hubert et al. | 105/26.05 |
| 6,474,068 | B1 | 11/2002 | Abdel Jalil et al. | |
| 6,530,224 | B1 | 3/2003 | Conchieri | |

(Continued)

FOREIGN PATENT DOCUMENTS

| | | |
|---|---|---|
| JP | 59-188003 A | 10/1984 |
| JP | 59-188004 A | 10/1984 |
| JP | 10-089015 A | 4/1998 |

*Primary Examiner* — Jason C Smith
(74) *Attorney, Agent, or Firm* — John R. S. Orange; Blake, Cassels & Graydon LLP

(57) ABSTRACT

A combined cycle power plant for a railway locomotive is disclosed. In one embodiment, the power plant comprises two prime movers operating independently of one another. The waste energy of one prime mover is used as the energy source of the other prime mover. The shaft work of each prime mover is connected to a common load. The shaft work of the first prime mover is directly connected to the load, whereas the shaft work of the second prime mover is selectively coupled or decoupled to the load using a clutch.

9 Claims, 4 Drawing Sheets

(56) References Cited

U.S. PATENT DOCUMENTS

| | | | |
|---|---|---|---|
| 6,814,686 B2 * | 11/2004 | Carriere et al. | 477/6 |
| 6,868,677 B2 | 3/2005 | Viteri et al. | |
| 6,910,335 B2 | 6/2005 | Viteri et al. | |
| 7,152,705 B2 * | 12/2006 | Alster et al. | 180/65.245 |
| 7,565,867 B2 * | 7/2009 | Donnelly et al. | 105/62.1 |
| 7,770,376 B1 | 8/2010 | Brostmeyer | |
| 7,770,525 B2 * | 8/2010 | Kumar et al. | 105/51 |
| 7,882,692 B2 | 2/2011 | Pronske et al. | |
| 7,971,538 B1 * | 7/2011 | Miller et al. | 105/50 |
| 2002/0073712 A1 | 6/2002 | Kopko | |
| 2003/0014962 A1 | 1/2003 | Tanaka et al. | |
| 2004/0159105 A1 | 8/2004 | Tanaka et al. | |
| 2004/0262924 A1 | 12/2004 | Wacker | |
| 2005/0022497 A1 | 2/2005 | Takai et al. | |
| 2010/0005775 A1 * | 1/2010 | Kipping | 60/39.182 |

* cited by examiner

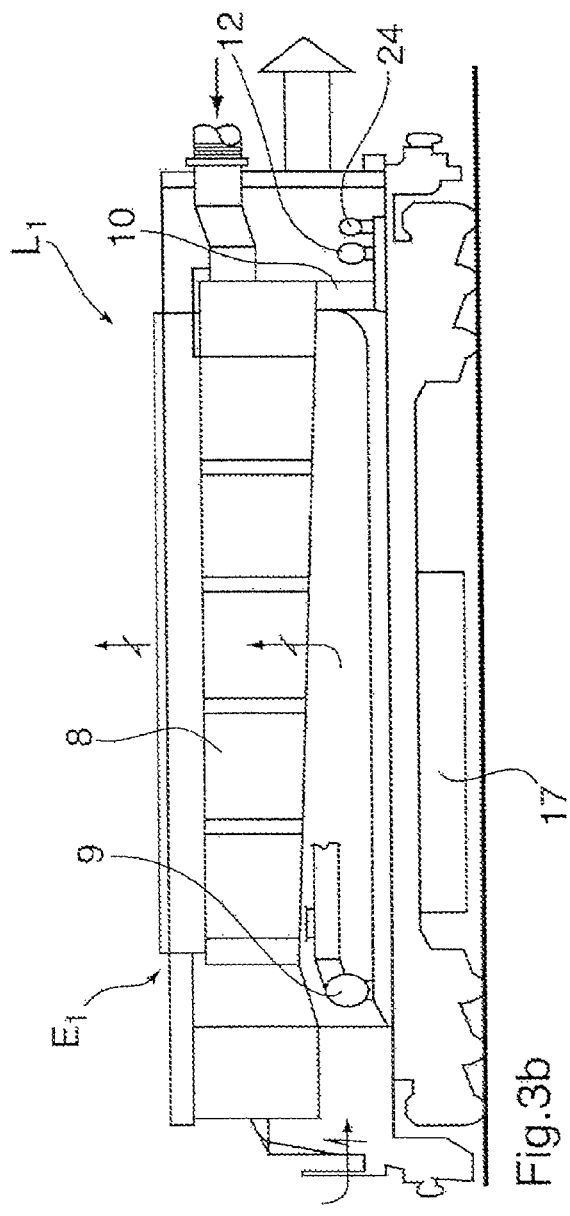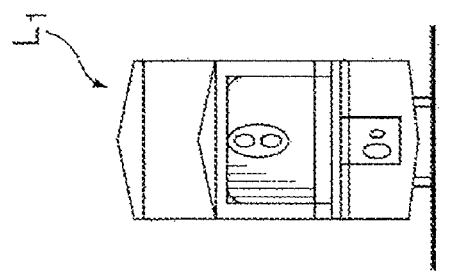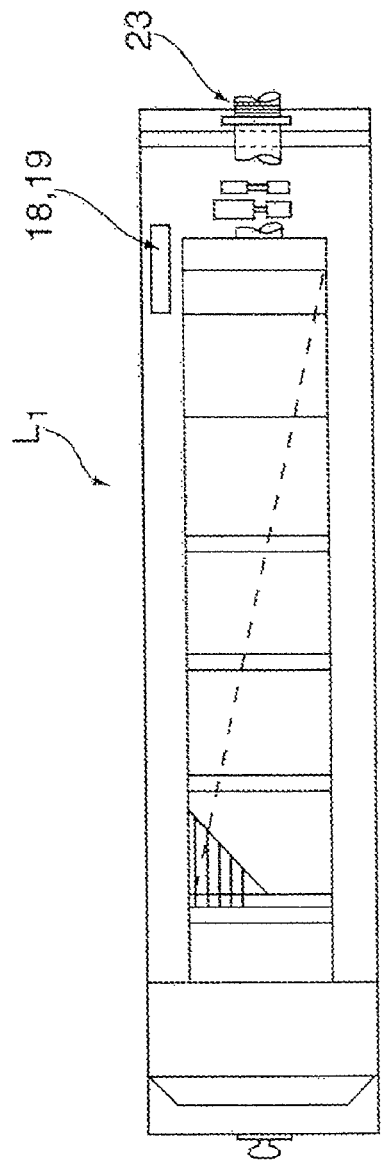

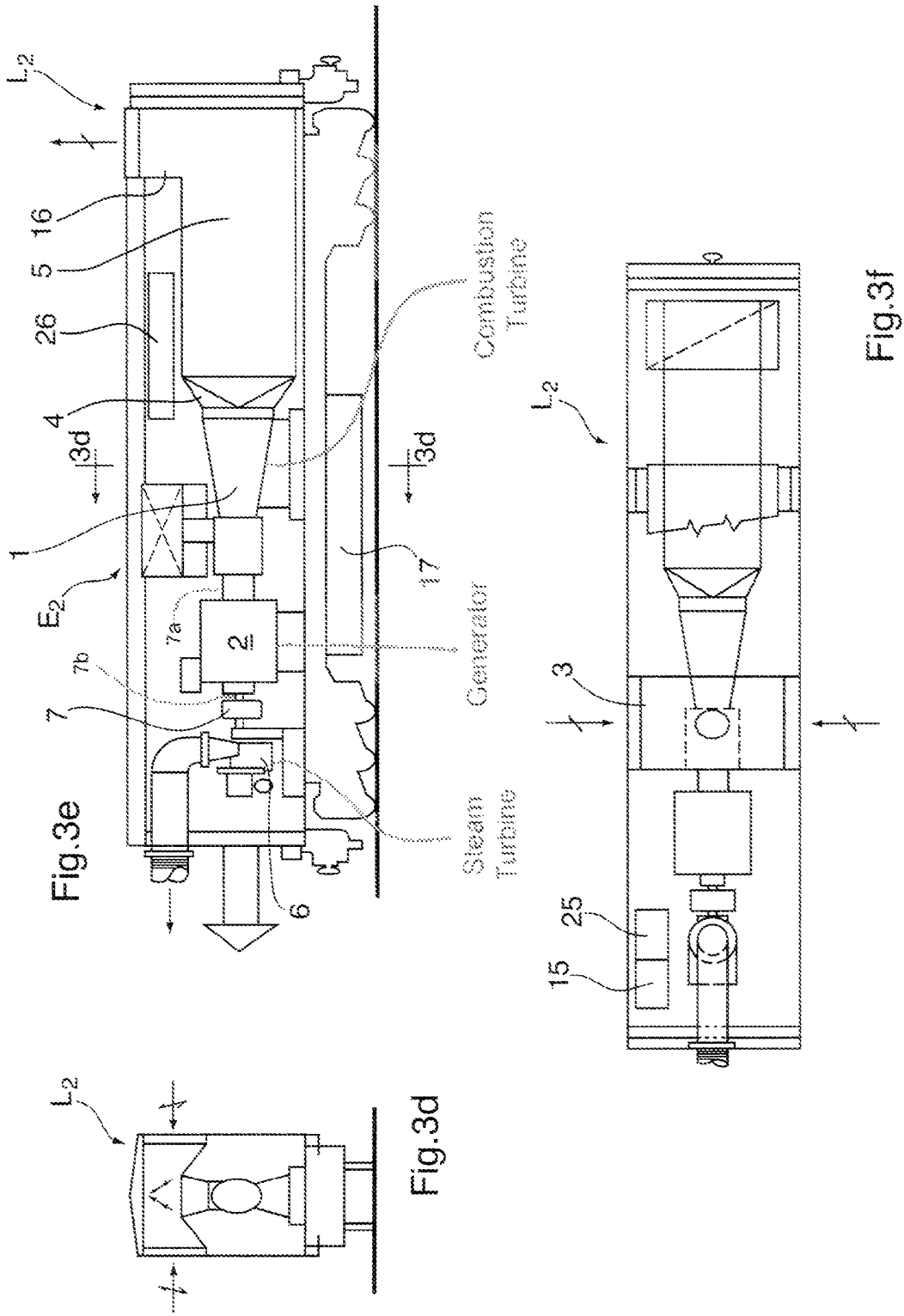

COMBINED CYCLE POWERED RAILWAY LOCOMOTIVE

This application is a continuation of U.S. patent application Ser. No. 12/473,804 filed on May 28, 2009, which claims priority from U.S. Provisional Application No. 61/056,689 filed on May 28, 2008, the contents of which are incorporated herein by reference.

FIELD OF THE INVENTION

The present invention relates generally to combined cycle power plants.

DESCRIPTION OF THE PRIOR ART

Combined cycle power plants are well known in the art and are discussed in patents such as U.S. Pat. No. 5,471,832 to Sugita et al., U.S. Pat. No. 3,990,230 to Kuwashima et al., and U.S. Pat. No. 5,778,675 to Nakhamkin.

A typical stationary combined cycle power plant may consist of one or more combustion turbines and one or more steam turbines arranged to operate in combination in a common facility. Often, a gas turbine of the aero derivative or industrial type operating on the Brayton thermodynamic cycle is used as a prime mover to drive an electrical generator or other industrial equipment. The exhaust gases from the gas turbine, which might otherwise be discharged directly to the atmosphere at considerable loss of heat energy, are directed through a heat recovery steam generator. Steam raised in the steam generator is supplied to a steam turbine, which is arranged to drive an electric generator or other mechanical equipment. Any portion of the steam leaving the steam turbine may be condensed in an air or water cooled condenser. Any steam not condensed may be used elsewhere for process purposes, creating a cogeneration plant. Steam may also be taken for this purpose directly from the heat recovery steam generator or from extraction points part way through the turbine.

Condensate and/or make-up feedwater, after deaeration to remove oxygen and non-condensable gases, is supplied by means of a boiler feed pump to the steam generator for evaporation and superheating, the process comprising a typical Rankine cycle steam power system.

In order to achieve optimum overall efficiency, the exhaust gases in the heat recovery boiler must be cooled to as low a temperature as possible short of risking condensation of moisture and resulting corrosion in the unit and stack. The amount of heat removed from the exhaust gas is maximized by heating the boiler feedwater in the steam generator rather than by using extraction steam from the steam turbine as is usual in conventional central station practice. The heat recovery steam generator may be of the conventional drum type with one, two or more pressure levels, as well as one or more superheater sections, or it may be of the forced circulation once-through Benson type. The combining of the gas turbine with a steam cycle increases the thermal efficiency of the installation, typically by 25% or more, depending on the steam conditions attainable.

In Japanese Patent No. JP359188003 to Makoto, a combined cycle power plant adapted for a marine application is disclosed. Makoto discloses two independent gas turbines, each gas turbine having an accompanying exhaust gas boiler that generates steam to drive a steam turbine. Both the gas turbine and the steam turbine are connected to a gear box to drive a single marine propeller. In this arrangement, both the gas turbine and steam turbine are always coupled to the load. This system is specifically suited to marine propulsion since a ship often requires steady and continuous propulsion during long journeys. Frequent stopping of the engine, or frequent acceleration or deceleration is usually not necessary.

In railway applications, it is common for the locomotive to frequently start, stop, accelerate, and decelerate. Currently, diesel engines are commonly used for railway locomotive propulsion, usually employing an electric power transmission system and axle mounted traction motors, but also and less frequently, using geared direct drive or hydraulic transmissions. Gas turbines have also been used, albeit less commonly and less successfully. U.S. Pat. No. 1,953,078 to Holzwarth and U.S. Pat. No. 3,148,503 to MacPhail et al. disclose locomotives in which a combined cycle power plant is utilized; however, the designs disclosed in these patents are complex, antiquated, and not particularly efficient. Moreover, they do not lend themselves well to incorporating all of the components of a closed combined cycle power plant in the confines of a railway locomotive.

It is an object of the present invention to obviate or mitigate at least some of the above disadvantages.

SUMMARY OF THE INVENTION

In one aspect of the invention, there is provided a combined cycle power plant for a railway locomotive comprising: (a) a first prime mover; (b) a second prime mover powered using the waste energy of the first prime mover, the second prime mover operating independently of the first prime mover; (c) a common load; (d) a first shaft driven by the first prime mover, the first shaft directly connected to the common load; and (e) a second shaft driven by the second prime mover, the second shaft including a clutch for selectively coupling and decoupling the second shaft and the common load. The clutch may, for example, be an overrunning clutch.

In one embodiment, the first prime mover comprises a combustion turbine system and the second prime mover comprises a steam turbine system. The steam turbine system includes a once-through steam generator, an air-cooled condenser, and a boiler feed pump. In another embodiment, the first prime mover may instead comprise a diesel engine.

In another embodiment, the combined cycle power plant further comprises an auxiliary diesel engine arranged to provide starting power to the first prime mover. For example, this may be achieved by means of a hydraulic system. Advantageously, if desired, in such embodiments the hydraulic power can be also used to move the locomotive when out of service without starting the first prime mover.

In another aspect of the invention, there is provided a railway locomotive having a combined cycle power plant arranged in its envelope. The combined cycle power plant comprises a first prime mover and a steam turbine system powered by the waste energy of the first prime mover. The steam turbine system comprises a steam turbine, a combustion turbine, a generator, and an air-cooled condenser. The steam turbine, the combustion turbine, and the generator are directly supported by a frame of the locomotive, and the air-cooled condenser is spatially positioned adjacent the outside of the envelope to access air flowing across the outside of the locomotive.

BRIEF DESCRIPTION OF THE DRAWINGS

An embodiment of the invention will now be described by way of example only with reference to the accompanying drawings, in which:

FIGS. 3a-3f are an alternative embodiment showing a general spatial arrangement of the combined cycle power plant in the envelope of two locomotives.

DETAILED DESCRIPTION OF THE INVENTION

Figure 1:
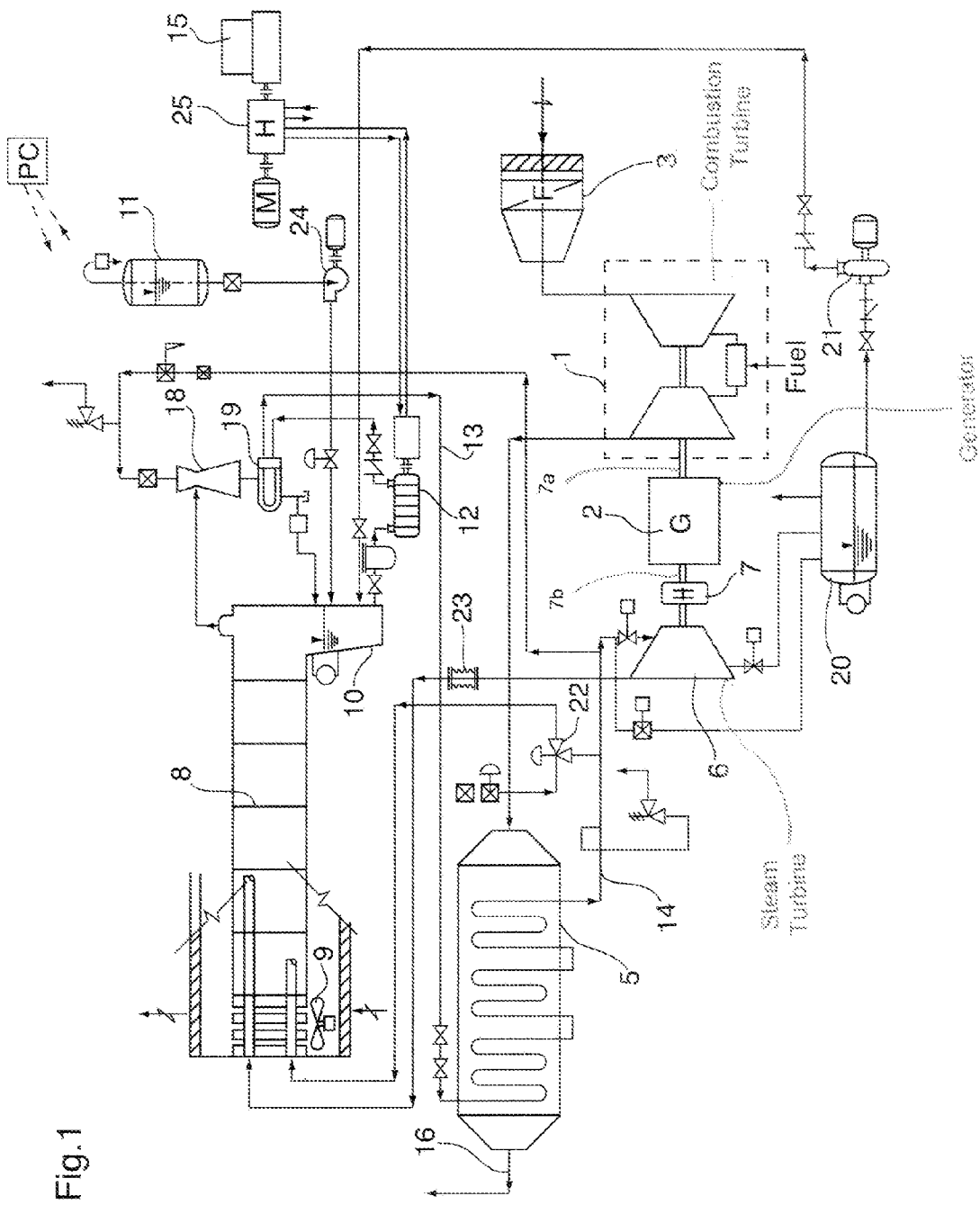
FIG. 1 is a schematic flow diagram of a combined cycle power plant applicable to railway locomotive propulsion.

In general terms, there is provided a simplified combined cycle power plant for use in railway locomotives. The simplified combined cycle power plant may be completely and compactly fit in one or more locomotive envelopes. It is recognized that by using embodiments of the simplified combined cycle power plant, increased fuel economy can be achieved over simple cycle gas turbine or diesel engine systems. The use of the combined cycle power plant will also result in less total exhaust gas emissions for a given power output. It is also recognized that railway locomotive propulsion generally results in the combined cycle power plant using lower steam pressures and temperature compared to combined cycle power plants used in traditional stationary applications or for marine propulsion. This allows for a simplified combined cycle power plant that includes: shorter cold start times due to reduced steam turbine warm-up time; less costly pipe fittings and valves; and smaller space requirements for thermal expansion. It is further recognized that in railway applications, it is advantageous to be able to selectively decouple one prime mover (e.g. the steam turbine) from the transmission during certain common scenarios, such as upon start-up of the power plant, while manoeuvring at low speed, or generally, under low power requirement service.

In one embodiment, the combined cycle power plant adapted for use in a railway locomotive comprises two prime movers operating independently of one another. The waste energy of one prime mover is used as the energy source of the other prime mover. The shaft work of each prime mover is connected to a common load, thereby providing system simplicity, as well as resulting in reduced cost and reduced physical volume. A clutch device can selectively decouple one prime mover from the common load, thereby allowing the connected prime mover to operate exclusively. The selective decoupling of one prime mover can also eliminate parasitic loading of one prime mover on the other. In one embodiment, due to the provision of the clutch, a fault in the steam cycle will not result in a complete shut down, and operation of the locomotive can continue unaffected.

In an exemplary embodiment, the combined cycle power plant comprises a combustion turbine system and a steam turbine system. The steam generator in the steam turbine system is a once-through type, this being suitable for railway locomotive use by virtue of its compactness, simplicity, ease of control, and adaptability to run dry. The combustion turbine system has once-through air flow. Atmospheric air passes through an intake filter, then into a compressor. The compressed air is mixed with fuel and ignited in a combustion chamber, and the combustion gases flow over the turbine to produce shaft work. The exhaust gas still contains thermal energy and is passed into a heat recovery steam generator before finally exiting the exhaust duct. Inside the heat recovery steam generator, the heat energy from the exhaust gas is transferred to the water, which is the circulating fluid within the steam turbine system. The water becomes heated and changes physical states, becoming superheated steam. The superheated steam is passed through the steam turbine to generate mechanical rotational movement. The exhaust steam from the turbine then passes through a condenser, which reverts the steam back to a low pressure water state. The water, at temperature and pressure equilibrium, is then passed through a boiler feed pump, which increases the pressure and moves the water back through the heat recovery steam generator.

The combustion and steam turbine systems are both connected to a single electric generator. The combustion turbine is permanently coupled to the electric generator, whereas the steam turbine may be selectively coupled or decoupled using a clutch. The clutch allows the independent operation of the combustion turbine. In one embodiment, decoupling occurs automatically if the steam turbine speed drops below the combustion turbine speed. To intentionally decouple at any load or speed, the boiler feedwater is interrupted and the waste heat boiler runs dry.

In railway applications, it is common for the locomotive to frequently start, stop, accelerate, and decelerate. The selective decoupling of the steam turbine conveniently accommodates these various scenarios. At high combustion turbine load levels, the coupling of the steam turbine to the electric generator adds significantly to the power output of the generator. However, at low combustion turbine loads, the exhaust gas temperature falls and sufficient steam of high enough temperature and pressure may not be produced to drive the steam turbine at useful power levels. Therefore, in one embodiment, when rotational speed cannot be maintained, the steam turbine is automatically decoupled from the common load. This allows the combustion turbine to avoid the extra load that would be imposed by the non-contributing steam turbine.

As an example, when the locomotive is idling, or when the locomotive is manoeuvring at low speeds, it is desirable to decouple the steam turbine from the common load. In contrast, when the locomotive is operating at high combustion turbine load levels and/or more power is required, it is desirable to couple the steam turbine to the common load. It will be appreciated that the steam turbine adds power most effectively at sustained full or high combustion turbine load levels.

Figure 2:
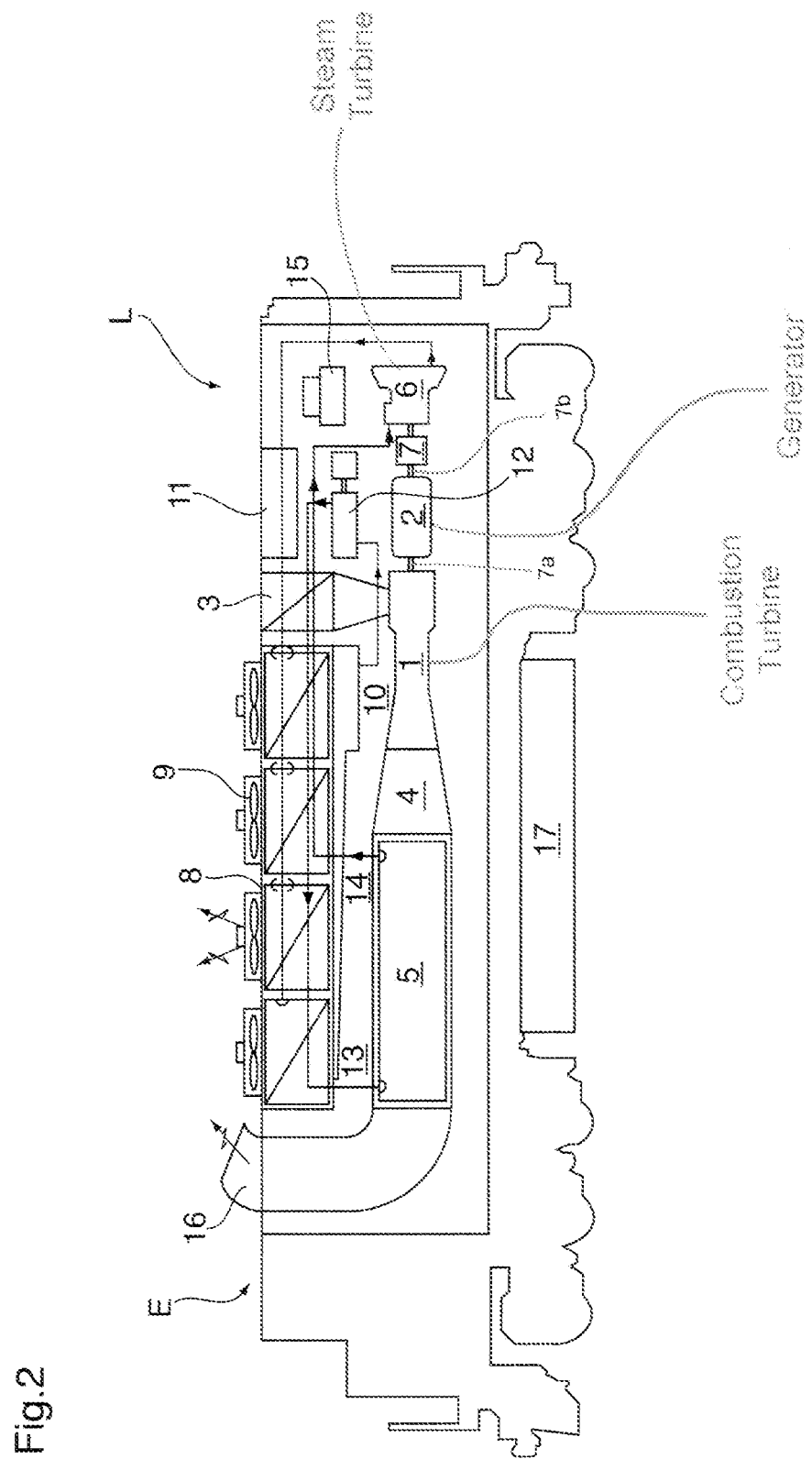
FIG. 2 is a locomotive envelope showing a general spatial arrangement of the combined cycle power plant in the envelope.

Embodiments will now be described with reference to the Figures. Turning first to FIGS. 1 and 2, a locomotive L has an envelope E that houses a combined cycle power plant. The combined cycle power plant comprises a combustion turbine 1 and a steam turbine 6. Both turbines drive a common electric generator 2, which supplies power to the locomotive's traction motors. The combustion turbine 1 is directly connected to the electric generator 2 by a shaft 7a, whereas the steam turbine 6 can be selectively decoupled by the action of the over-running clutch 7 in drive shaft 7b. Atmospheric air passes into the combustion turbine 1 through an air intake filter 3, and exhaust from the combustion turbine 1 is conducted through an exhaust transition and expansion joint 4 to a once-through heat recovery steam generator 5. Cooled exhaust gas exits the heat recovery steam generator 5 through an exhaust duct and outlet 16 to the atmosphere.

The circulating fluid in the steam turbine system is water. The boiler feedwater enters the heat recovery steam generator 5 through the boiler feedwater line 13. Superheated steam exits the heat recovery steam generator 5 through the main steam line 14 and drives the steam turbine 6. The steam turbine exhaust is reverted back to a water state at a temperature and pressure equilibrium in a condenser 8, which in the embodiment shown in the figures is an extended surface air-cooled condenser 8. Atmospheric air for cooling is vertically drawn through louvers on the sides of the engine cowl and through the heat exchange surface by condenser cooling fans 9 on the top or on the opposite sides of the cowl. The low pressure feedwater collects in the hotwell 10, and is pressurized by a variable speed boiler feed pump 12. Make-up feedwater is added as required to the hotwell 10 from a reserve tank 11 using pump 24.

Ejector 18 removes any non-condensables from the condenser 8. The ejector 18 is supplied with main steam at reduced pressure. The exhaust from the ejector is condensed by boiler feedwater in ejector vent condenser 19, and the condensate is returned to hotwell 10.

A small auxiliary diesel engine 15 acts to supply starting power to the combustion turbine 1. The auxiliary diesel engine 15 may also be arranged to move the locomotive L without starting the combustion turbine 1 or to drive auxiliary equipment if desired. As shown in FIG. 1, the diesel engine 15 drives a dual drive hydraulic fluid system pump/reservoir or hydraulic unit 25, although it will be appreciated that an electric dual drive could be employed instead if desired. Hydraulic power from the hydraulic unit 25 is provided to start the combustion turbine 1. Also, a hydraulic motor (or motors) connected to one or more truck axles (not shown) of the locomotive L can allow the locomotive to be moved without starting the combustion turbine 1. Once sufficient electrical power is generated by the electric generator 2, the locomotive L is driven instead by electric generator 2. Hydraulic power is also provided to power the variable speed boiler feed pump 12.

Upon start up, when locomotive propulsion is required, the auxiliary diesel engine 15 supplies power to start the combustion turbine 1 by means of the hydraulic unit 25 or, alternatively, by instead using an electric generator (not shown). Atmospheric air is drawn through an intake filter 3 and into a compressor in the combustion turbine 1. The compressed air is mixed with fuel and ignited in a combustion chamber. The combustion gases flow over the turbine to produce shaft work, which drives the electric generator 2. The exhaust gas is conducted through the exhaust transition and expansion joint 4 to the once-through heat recovery steam generator 5 before being exhausted to the atmosphere through the exhaust duct and outlet 16. After stable operation of the combustion turbine 1 has been established and sufficient power demand exists, the steam system may be engaged by an operator. A programmable computer (not shown) controls the start up sequence without further operator intervention. Engaging the steam system includes opening drain valves at steam piping low points until all condensate has been removed and adequate steam temperature has been established. Drains are collected in a drain receiver 20 and removed by a drain pump 21 and pumped to the hotwell 10. A steam turbine stop valve is opened, and when the speed of the steam turbine 6 reaches that of the common generator, the over-running clutch 7 will engage.

Thereafter, during normal operation, superheated steam is generated within the tubular heat transfer surface of the heat recovery once-through steam generator 5 by extracting heat from the exhaust gases flowing through steam generator 5. Control of the steam supply is effected by regulating the feedwater flow at the once-through steam generator 5 inlet as a function of temperature. The superheated steam flows through the main steam line 14 to a steam turbine 6, which also drives the electric generator 2 through the engaged clutch 7. Advantageously, superheated steam is produced in the once-through steam generator 5 using only the exhaust gas of the combustion turbine 2 before the exhaust gas exits through outlet 16. A relatively high percentage of the waste heat is therefore recovered.

Exhaust steam from the steam turbine 6 is condensed in the extended surface air-cooled condenser 8. The condenser 8 is arranged for deaeration of the condensate to remove oxygen and non-condensable gases to the greatest extent possible. Ejector 18 removes any non-condensables from the condenser 8 and maintains the vacuum.

After collection in the hotwell 10, the feedwater is pressurized by the boiler feed pump 12 and supplied to the heat recovery steam generator 5 through the boiler feedline 13. If make-up feedwater is required, it is added to the hotwell 10 from the reserve feedwater tank 11. In this way, used steam is condensed and returned to the cycle as condensate.

The programmable computer controls all function related to the operation of the steam generator, including, for example, control of the steam temperature by varying the speed of the boiler feed pump 12 and control of condenser pressure by starting and stopping the air fans 9.

During the regular operation described above, the steam system will remain engaged at all loads until adequate steam temperature cannot be maintained, at which point it will be automatically disengaged. Additionally, the heat recovery steam generator 5 may be operated dry, and when no steam is flowing, the over-running clutch 7 will allow the steam turbine 6 to automatically disconnect from the electric generator 2. When the steam system is disengaged by the operator or tripped due to a fault, a by-pass system conditioning valve 22 opens to prevent the steam relief valve from lifting. Boiler feedwater will reduce the steam enthalpy to a level suitable for acceptance by the main condenser. Advantageously, the combustion turbine system will still continue to function normally during and after disengagement of the steam system.

During regular service it is common for the locomotive L to make frequent stops. It may be preferred to save fuel by stopping the combustion turbine 1 whenever the locomotive is stationary for more than a short period of time. The auxiliary diesel engine 15 supplies power to re-start the combustion turbine 1 once locomotive propulsion is again required. The diesel engine 15 may also be arranged to supply enough power to move the locomotive L without starting the combustion turbine 1, if desired, or to drive auxiliary equipment (not shown).

FIG. 2 shows generally the components of the combined cycle power plant spatially arranged to fit compactly in a standard locomotive envelope E, which is approximately 10 ft by 10 ft by 80 ft. The combustion turbine 1, steam turbine 6, and electric generator 2, being the heaviest items are arranged low in the enclosed envelope E to receive support directly from the frame of the locomotive L and to maintain a low centre of gravity. The heat recovery steam generator 5 is placed in line with the exhaust duct and outlet 16 in order to minimize large ductwork and maintain streamlined gas flow. The air-cooled condenser 8 is large in volume and relatively light and requires maximum access to outside air flow. It is therefore positioned along the top of the cowl, convenient to atmospheric air surrounding the body of the locomotive L. In some embodiments, the condenser 8 is positioned such that forward motion of the locomotive L produces an air flow through the condenser 8. Advantageously, in such embodiments, the cooling fans 9 therefore only need to operate when the locomotive L is travelling at low speed.

The placement of smaller equipment, such as the boiler feed pump 12 and the auxiliary diesel engine 15, is not as important, and such smaller equipment can be located in the envelope E wherever it is convenient.

It will be appreciated that for locomotives of higher power, the complete equipment may not fit easily in one conventional or practical size unit. In this case, a second unit can be added. This is shown in FIG. 3.

Turning therefore to FIG. 3, two locomotive units L1 and L2 are shown, each one having an envelop E1 and E2 respectfully. The two locomotives are connected in tandem. FIGS. 3(a) to 3(c) show a front, side, and top view of locomotive L1 and FIGS. 3(d) to 3(f) show a front, side, and top view of locomotive L2. As can be seen in FIGS. 3(a) to 3(c), there is positioned in the envelope E1 of locomotive L1 the condenser 8, fans 9, hotwell 10, boiler feedpump 12, the makeup pump 24, the ejector 18 and the ejector vent condenser 19. Additionally, a fuel tank 17 is positioned under the locomotive L1. As shown in FIGS. 3(d) to 3(f), the remainder of the components are positioned in envelope E2 of locomotive L2, including the combustion turbine 1, the steam turbine 6, the clutch 7, the electric generator 2, the steam generator 5, the air intake filter 3, the auxiliary diesel engine 15, the hydraulic unit 25, the exhaust duct outlet 16, and a combustion turbine generator cooler 26.

A flexible connection 23 transports exhaust steam from the steam turbine 6 on locomotive L2 to the condenser 8 on locomotive L1.

Similar to the embodiment shown in FIG. 2, in locomotive L2 the combustion turbine 1, steam turbine 6, and electric generator 2 are arranged low in the enclosed envelope E2 to receive support directly from the frame of the locomotive L2 and to maintain a low centre of gravity. The air-cooled condenser 8 is positioned in locomotive L1 along the top of the cowl, convenient to atmospheric air surrounding the body of the locomotive L1.

Alternative embodiments to those described above are also contemplated and fall within the spirit and scope of the invention. For example, the combustion turbine and steam turbine systems need not drive an electric generator. Alternatively, for example, the turbines could power a direct drive system through reduction gearing and/or fluid coupling. Also, a diesel prime mover could replace the combustion turbine discussed above, although combustion turbines are advantageous since they generally weigh less and allow a higher fraction of waste heat to be recoverable from the exhaust gas. As another example, an alternative embodiment could employ an open steam system in place of the air-cooled condenser, although such a system would necessitate carrying large quantities of water and establishing water treatment plants and facilities for re-filling the unit.

The above described embodiments could be further simplified by increasing the condensing pressure to atmospheric (or slightly above) instead of maintaining a vacuum. This would eliminate the need for creating and maintaining a vacuum in the condenser. Such a modification would require the addition of a steam ejector or vacuum pump, and would increase the start-up time; however, the difficulty of maintaining vacuum tight mechanical seals and joints in the shock-prone and vibration-prone railway operating environment would advantageously be eliminated.

Although the invention has been described with reference to certain specific embodiments, various modifications thereof will be apparent to those skilled in the art without departing from the spirit and scope of the invention as outlined in the claims appended hereto.

What is claimed is:

1. A combined cycle power plant for a railway locomotive comprising:
   (a) a first prime mover having an exhaust to convey exhaust gases;
   (b) a second prime mover, said second prime mover connected to said exhaust of said first prime mover to receive the waste heat energy of the exhaust of said first prime mover to power said second prime mover, said second prime over operating independently of said first prime mover;
   (c) a common load;
   (d) a first shaft driven by said first prime mover, said first shaft directly connected to said common load; and
   (e) a second shaft driven by said second prime mover, said second shaft including a clutch for selectively coupling and decoupling said second shaft and said common load.

2. The combined cycle power plant of claim 1 wherein said first prime mover comprises a combustion turbine system and said second prime mover comprises a steam turbine system.

3. The combine cycle power plant of claim 2 wherein said steam turbine system comprises a once-through steam generator.

4. The combined cycle power plant of claim 2 wherein said steam turbine system includes an air-cooled condenser.

5. The combined cycle power plant of claim 2 wherein a steam turbine, a combustion turbine, and a generator are positioned so as to be directly supported by a frame of the locomotive in the locomotive envelope.

6. The combined cycle power plant of claim 5 wherein an air-cooled condenser is spatially positioned to be adjacent the outside of the locomotive envelope to access air flowing across the outside of the locomotive.

7. The combined cycle power plant of claim 1 wherein said first prime mover comprises a diesel system and said second prime mover comprises a steam turbine system.

8. The combined cycle power plant of claim 1 further comprising an auxiliary diesel engine arranged to provide starting power to said first prime mover.

9. A railway locomotive having a combined cycle power plant arranged in an envelope; the combined cycle power plant comprising a first prime mover having an exhaust to convey exhaust gases and a steam turbine system connected to said exhaust of said first prime mover to receive the waste heat energy of the exhaust of the first prime mover to power said steam turbine system; the steam turbine system comprising a steam turbine, a combustion turbine, a generator, and an air-cooled condenser; the steam turbine, the combustion turbine, and the generator being directly supported by a frame of the locomotive, and the air-cooled condenser being spatially positioned adjacent the outside of the envelope to access air flowing across the outside of the locomotive.

\* \* \* \* \*

UNITED STATES PATENT AND TRADEMARK OFFICE
CERTIFICATE OF CORRECTION

PATENT NO. : 8,667,899 B2  
APPLICATION NO. : 13/586555  
DATED : March 11, 2014  
INVENTOR(S) : John Kipping Page 1 of 1

It is certified that error appears in the above-identified patent and that said Letters Patent is hereby corrected as shown below:

In the Claims

Column 8 line 14 Claim 1(b): Replace "over" with -- mover --
Column 8 line 25 Claim 3: Replace "combine" with -- combined --

Signed and Sealed this
Twenty-ninth Day of July, 2014

Michelle K. Lee
*Deputy Director of the United States Patent and Trademark Office*